United States Patent
Kim et al.

(10) Patent No.: US 9,785,007 B2
(45) Date of Patent: Oct. 10, 2017

(54) DISPLAY WITH LOCALIZED BACKLIGHT DIMMING

(71) Applicant: Apple Inc., Cupertino, CA (US)

(72) Inventors: ByoungSuk Kim, Seoul (KR); Jun Qi, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 14/249,237

(22) Filed: Apr. 9, 2014

(65) Prior Publication Data

US 2015/0296580 A1   Oct. 15, 2015

(51) Int. Cl.
*G02F 1/1335* (2006.01)
*H05B 33/08* (2006.01)
*G09G 3/34* (2006.01)

(52) U.S. Cl.
CPC ..... *G02F 1/133603* (2013.01); *G09G 3/3426* (2013.01); *H05B 33/086* (2013.01); *G02F 2001/133601* (2013.01); *G02F 2001/133612* (2013.01); *G09G 2320/0686* (2013.01)

(58) Field of Classification Search
CPC ........... H05B 33/0845; G02F 1/133603; G02F 2001/133601; G02F 2001/133612
USPC ........................................................ 349/61
See application file for complete search history.

(56) References Cited

U.S. PATENT DOCUMENTS

| | | | |
|---|---|---|---|
| 6,172,661 B1 | 1/2001 | Imajo et al. | |
| 7,186,003 B2 * | 3/2007 | Dowling | F21S 8/035 315/295 |
| 7,339,202 B2 | 3/2008 | Chiu et al. | |
| 7,425,729 B2 | 9/2008 | Yun et al. | |
| 7,866,869 B2 | 1/2011 | Karakawa | |
| 8,833,956 B2 * | 9/2014 | Matsumoto | G02F 1/133603 349/67 |
| 2006/0094137 A1 * | 5/2006 | Yan | H01L 33/486 438/21 |
| 2008/0066356 A1 * | 3/2008 | Miller | G02B 6/0038 40/546 |

(Continued)

FOREIGN PATENT DOCUMENTS

| | | | |
|---|---|---|---|
| JP | 2006236636 A | * | 9/2006 |
| WO | 2005088599 | | 9/2005 |

*Primary Examiner* — Hoan C Nguyen
(74) *Attorney, Agent, or Firm* — Treyz Law Group, P.C.; G. Victor Treyz; Kendall W. Abbasi

(57) ABSTRACT

A display may have an array of display pixels for displaying images for a user. A backlight unit may provide backlight for the display pixels. The backlight unit may have a substrate such as a printed circuit substrate. An array of locally dimmable backlight elements may be mounted on the substrate. The substrate may be mounted against an inner surface of a metal electronic device housing or other support structure in an electronic device. Each backlight element may have a semiconductor package containing a semiconductor die. The semiconductor die may have a light-emitting diode and a light-emitting-diode control circuit. The light-emitting-diode control circuit may have a pair of transistors and a capacitor. One of the transistors may be connected in series with the light-emitting diode. The light-emitting diode control circuit may receive control signals on a gate line terminal and a source line terminal.

12 Claims, 9 Drawing Sheets

(56) References Cited

U.S. PATENT DOCUMENTS

| | | | |
|---|---|---|---|
| 2008/0170054 A1* | 7/2008 | Chou | G09G 3/3426 345/205 |
| 2010/0296026 A1* | 11/2010 | Kubota | G02B 6/0068 349/62 |
| 2011/0018912 A1* | 1/2011 | Adachi | G09G 3/3413 345/690 |
| 2011/0227481 A1* | 9/2011 | Chen | H05B 33/0821 315/51 |
| 2011/0241190 A1* | 10/2011 | Elian | H01L 21/56 257/676 |
| 2011/0248171 A1* | 10/2011 | Rueger | G01S 3/7803 250/340 |
| 2013/0155351 A1 | 6/2013 | Garelli et al. | |

* cited by examiner

DISPLAY WITH LOCALIZED BACKLIGHT DIMMING

BACKGROUND

This relates generally to electronic devices and, more particularly, to electronic devices with displays.

Electronic devices often include displays. For example, cellular telephones and computers have displays.

Displays such as liquid crystal displays have arrays of display pixels. Display driver circuitry is used to display images on a display by loading image data into an array of display pixels. To enhance visibility of the images on a display, the display may be provided with a backlight unit. The backlight unit emits backlight that passes through the array of display pixels and illuminates the images that are being displayed.

The dynamic range of a display may be enhanced by using a backlight unit that is capable of localized dimming. This type of backlight unit has an array of light-emitting diodes spread across the display. In portions of the display in which bright image content is being displayed, the light-emitting diodes are driven and supply backlight. In portions of the display in which black image content is being displayed, the light-emitting diodes can be turned off to ensure that the display appears completely black.

It can be challenging to implement a backlight unit with local dimming capabilities in a display. If care is not taken, the circuitry used to drive the array of light-emitting diodes can be overly complex. Drive circuit complexity can be reduced by using fewer light-emitting diodes in the display, but the lowered backlight resolution that results from this type of approach can give rise to undesired visible artifacts such as halos around bright portions of an image that are set against dark backgrounds.

It would therefore be desirable to be able to provide improved backlighting for a display.

SUMMARY

A display may be provided with liquid crystal display layers. The display layers may have an array of display pixels for displaying images for a user.

A backlight unit may provide backlight for the display layers. The backlight unit may have a substrate such as a printed circuit substrate. An array of locally dimmable backlight elements may be mounted on the substrate. The substrate may be mounted against an inner surface of a metal electronic device housing or other support structure in an electronic device.

Each backlight element in the array of backlight elements may have a semiconductor package containing a semiconductor die. The semiconductor die may include a light-emitting diode and a light-emitting diode control circuit. The light-emitting diode control circuit may have a pair of transistors and a capacitor coupled between the transistors. One of the transistors may be connected in series with the light-emitting diode and may serve as a voltage controlled current source. The other transistor may serve to control the application of control signals to the voltage controlled current source transistor. The light-emitting diode control circuit may receive control signals on a gate line terminal and a source line terminal.

If desired, the light-emitting diode of each backlight element may be provided as a discrete device and the light-emitting diode control circuitry of that backlight element may be implemented using a semiconductor die that is separate from the discrete device. Arrangements in which two or four backlight elements are mounted in a common semiconductor package may also be used.

DETAILED DESCRIPTION

Electronic devices may be provided with displays such as liquid crystal displays. A backlight unit (sometimes referred to as a backlight) can be used to provide backlight illumination to a liquid crystal display. The dynamic range of the display can be enhanced by using a backlight unit that supports localized dimming. Illustrative electronic devices of the types that may be provided with a backlight unit that supports localized dimming are shown in FIGS. 1, 2, 3, and 4.

Figure 1:
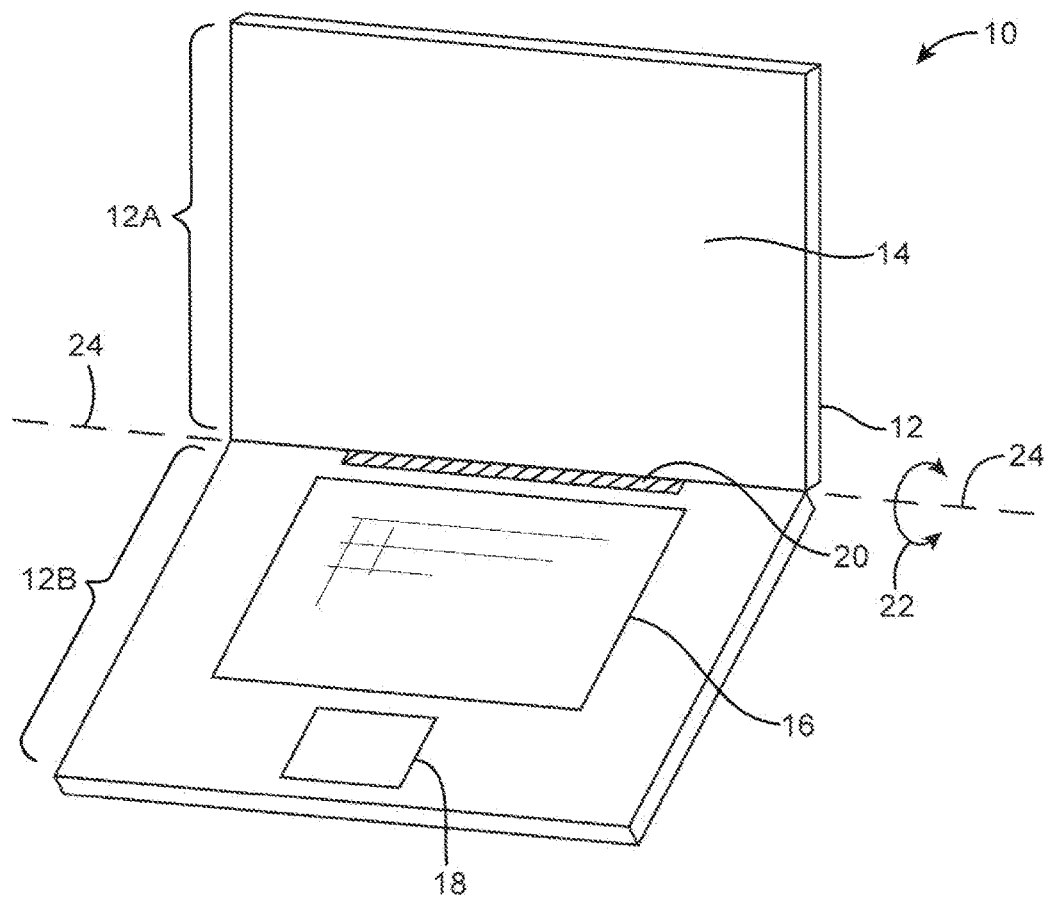
FIG. 1 is a perspective view of an illustrative electronic device such as a laptop computer with a display in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
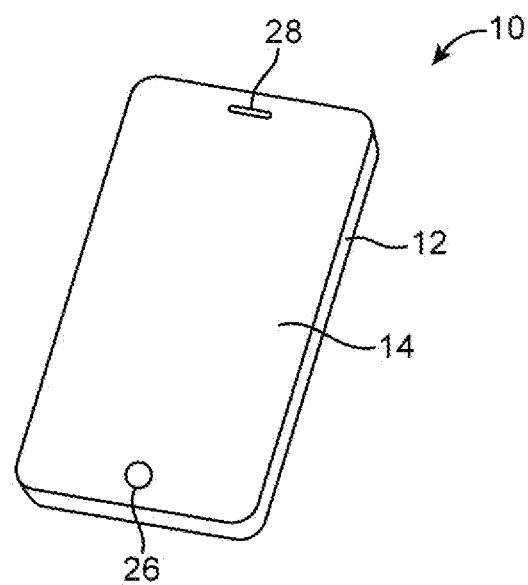
FIG. 2 is a perspective view of an illustrative electronic device such as a handheld electronic device with a display in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28. Device 10 may, if desired, be a compact device such as a wrist-mounted device or pendant device (as examples).

Figure 3:
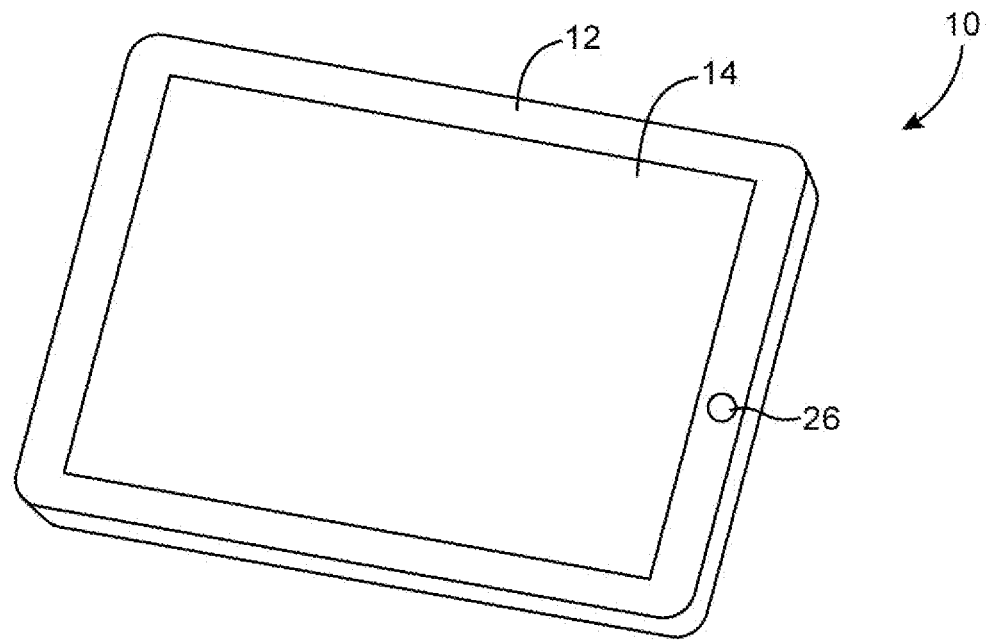
FIG. 3 is a perspective view of an illustrative electronic device such as a tablet computer with a display in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
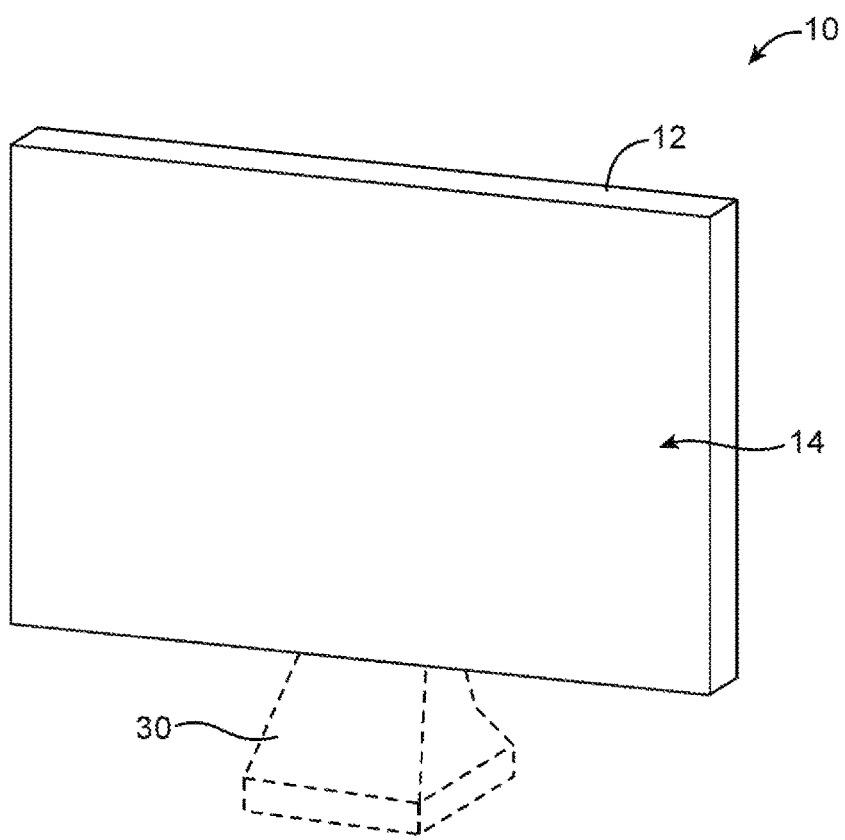
FIG. 4 is a perspective view of an illustrative electronic device such as a display for a computer or other electronic device in accordance with an embodiment.

FIG. 4 shows an illustrative configuration for electronic device 10 in which device 10 is a computer display, a computer that has an integrated computer display, a stand-alone display for other equipment, or other electronic device that includes a display. Display 14 is mounted on a front face of housing 12. With this type of arrangement, housing 12 for device 10 may be mounted on a wall or may have an optional structure such as support stand 30 to support device 10 on a flat surface such as a tabletop or desk.

Figure 5:
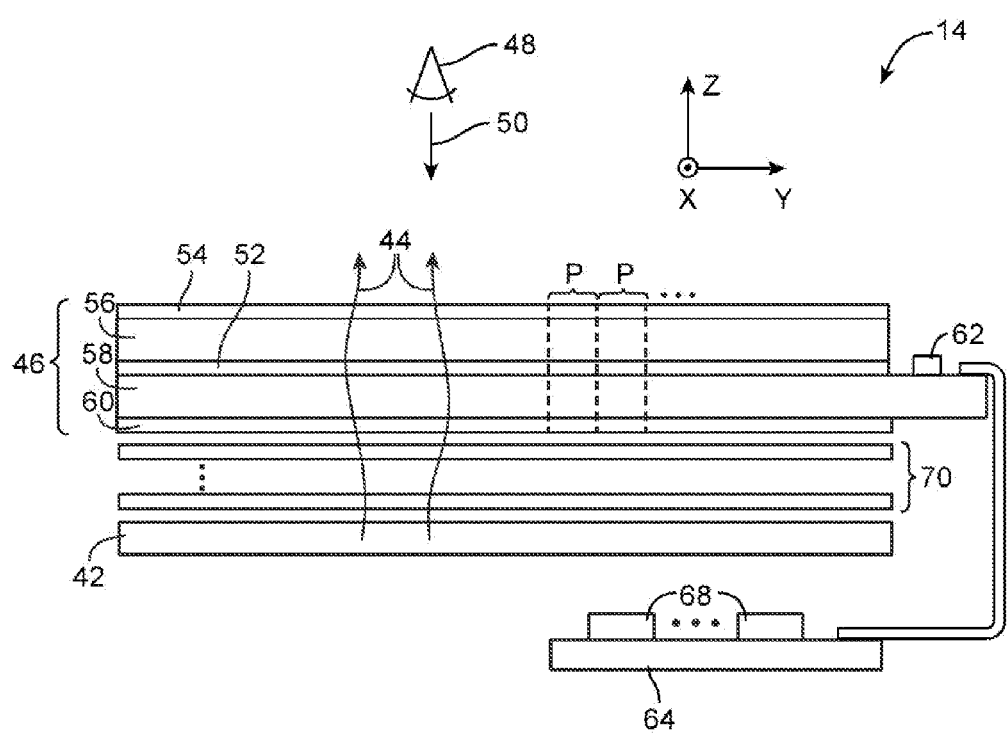
FIG. 5 is a cross-sectional side view of an illustrative display in accordance with an embodiment.

Display 14 may be a liquid crystal display or a display that includes display structures formed using other display technologies. A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include display layers 46 that include an array of display pixels P for displaying images for a user and may include backlight structures such as backlight unit 42 for producing backlight 44. During operation, backlight 44 travels outwards (vertically upwards in dimension Z in the orientation of FIG. 5) and passes through the array of display pixels P in display layers 46. This illuminates any images that are being produced by the array of display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit such as integrated circuits 68 on printed circuit 64) may be used to generate information to be displayed on display 14 (e.g., display data). The information to be displayed may be conveyed to display driver circuitry 62 using signal path 64. Display driver circuitry 62 may include one or more integrated circuits such as column driver integrated circuits for driving data signals onto corresponding data lines in display 14, gate driver circuitry for supplying gate signals to gate lines in display 14, and a timing controller (TCON) integrated circuit that supplies image data to the column drivers and gate driver controls signals to the gate driver circuitry. Display driver circuitry 62 may also include circuitry for controlling the application of backlight control signals to backlight unit 42. If desired, display driver circuitry for the display pixels of display 14 may be implemented using thin-film transistor circuitry (e.g., gate drivers or other driver circuitry on a thin-film transistor layer, etc.).

Backlight unit 42 may include a substrate such as a printed circuit substrate. An array of backlight elements may be mounted on the substrate. The backlight elements include light-emitting diodes and light-emitting-diode control circuits for controlling operation of the light-emitting diodes. Light from the light-emitting diodes may serve as backlight 44 for display 14. The intensity of the light emitted from each of the light-emitting diodes is preferably individually controllable to implement localized backlight dimming for display 14.

Optical films 70 may be interposed between backlight unit 42 and display layers 46 and/or may be incorporated elsewhere in display 14. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the structures in backlight unit 42. In configurations in which display layers 46 have a rectangular footprint in the X-Y plane of FIG. 5, optical films 70 and backlight unit 42 may have a matching rectangular footprint.

Display 14 may have an array of display pixels (e.g., a rectangular array having rows and columns) for displaying images to a viewer. Vertical signal lines called data lines may be used to carry display data to respective columns of display pixels. Horizontal signal lines called gate lines may be used to carry gate line signals (sometimes referred to as gate control signals or gate signals) to respective rows of display pixels.

The display pixels in display 14 may have a density of about 50-300 pixels per inch or other suitable density (e.g., a density above or below 100 pixels per inch). Backlight unit 42 preferably has individually adjustable backlight elements arranged in an array with a lower density than the array of display pixels in display 14. For example, there may be 500,000 or more, 5 million or more, or 50 million or more display pixels in display 14, whereas a backlight unit with the same footprint may contain one tenth of this number of backlight elements in the array of backlight elements in backlight unit 42 (or fewer than one tenth), one hundredth or fewer backlight elements, or one thousandth or fewer backlight elements in the backlight unit of display 14.

The display pixels of layers 46 in a liquid crystal display generally exhibit a limited dynamic range (i.e., the black-to-white ratio of the display pixels in display 14 is not zero). To enhance the dynamic range of display 14, the backlight elements in backlight unit 42 may be individually controlled (i.e., backlight unit 42 may use a localized dimming scheme). With this type of approach, some light-emitting diodes in backlight unit 42 are turned on and supply backlight to portions of display 14 in which bright image content is being displayed, whereas other light-emitting diodes in backlight unit 42 are turned off to ensure that black image content can be displayed properly (i.e., to ensure the sufficiently dark black levels are achieved).

To avoid overwhelming the control circuitry for the backlight unit, an array of actively driven backlight elements can be used in backlight unit 42. Each actively driven backlight element includes a light-emitting component such as a light-emitting diode and integrated control circuitry for controlling the light-emitting component.

Figure 6:
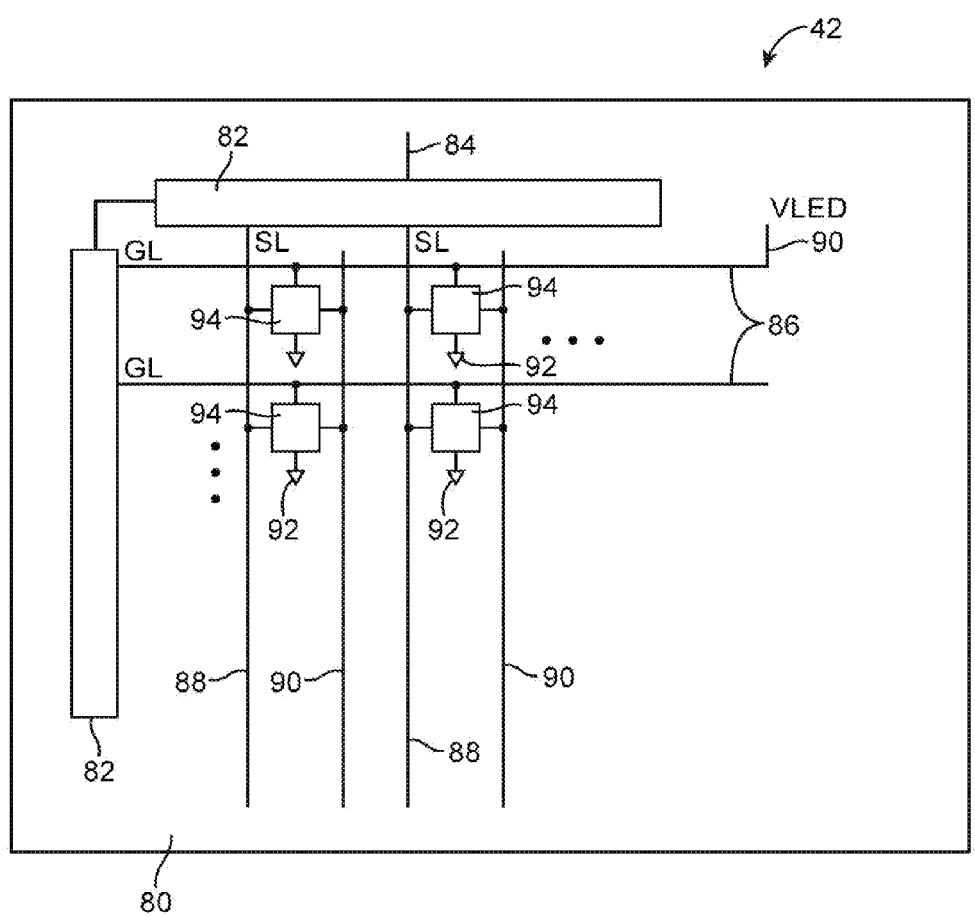
FIG. 6 is a circuit diagram of an illustrative backlight unit having an array of light-emitting diodes in accordance with an embodiment.

This type of arrangement is shown in FIG. 6. As shown in FIG. 6, backlight unit 42 may include an array of backlight elements such as backlight elements 94. Backlight elements 94 may be organized in rows and columns and may be mounted on a substrate such as substrate 80. Substrate 80 may be a rigid printed circuit board (e.g., a printed circuit formed from a material such as fiberglass-filled epoxy) or may be a flexible printed circuit (e.g., a printed circuit formed from a flexible polyimide layer or a substrate formed from a layer of other polymer material). Other mounting arrangements may be used for backlight elements 94 if desired. For example, backlight elements 94 may be mounted on the interior of a device housing and may be interconnected using wires or cables, backlight elements may be mounted on a plastic carrier, etc.

Backlight elements 94 may be based on integrated circuit die that include drive circuitry and light-emitting diode structures for emitting backlight 44. Each backlight element drive circuit may be provided on the same die as the light-emitting diode that is being controlled by that circuit or may be provided on a separate die that is mounted in a common semiconductor package with the light-emitting diode.

During operation of display 14 in device 10, backlight control information for backlight unit 42 may be generated by control circuitry 68 and/or other control circuits (e.g., backlight information may form part of the display data that is being used to control the array of display pixels in display layers 46 of display 14). The backlight information may specify the strength of the backlight illumination 44 to be produced by each of the backlight elements 94 in backlight unit 42.

The backlight control information may be supplied to backlight control circuitry 82 in backlight unit 42 via path 84. Backlight control circuitry 82 may include row driver circuitry for driving backlight gate line signals GL into the array of backlight elements 94 on gate lines 86 and may include column driver circuitry for driving backlight source line signals SL into the array of backlight elements 94 on source lines 88. Power supply voltage VLED (e.g., a positive power supply voltage at a fixed voltage level) may be supplied to backlight elements 94 using power supply lines 90. A ground power supply voltage may be supplied to backlight elements 94 on ground lines 92. Backlight control circuitry 82 may be implemented in one or more display driver integrated circuits (e.g., a timing controller integrated circuit, a display column driver integrated circuit, other display driver integrated circuit(s) 62, portions of circuits 68, etc.).

Figure 7:
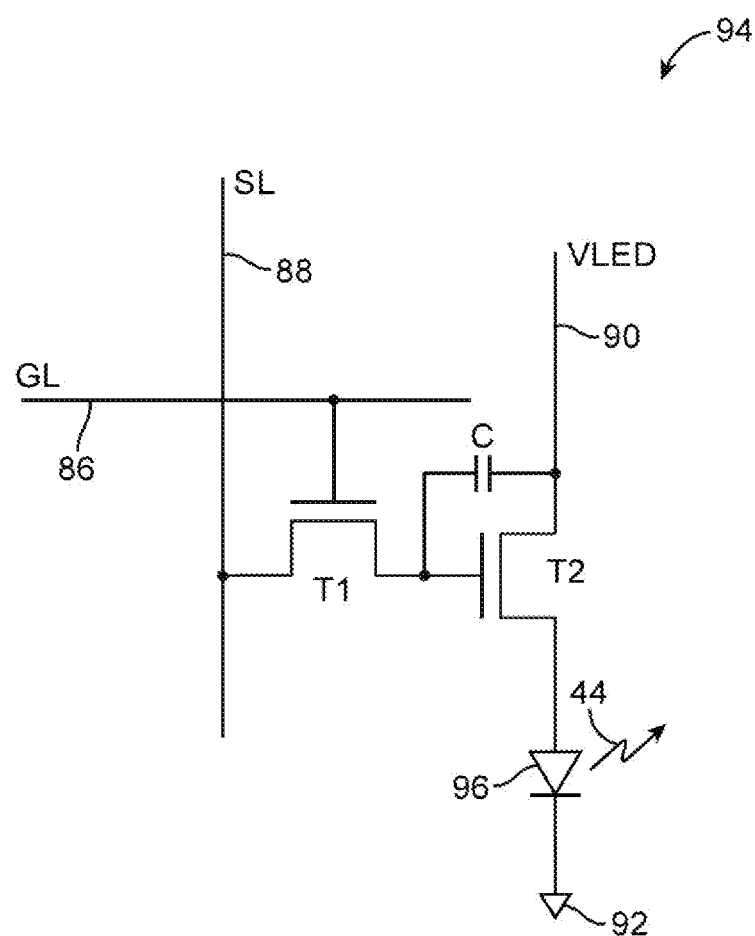
FIG. 7 is a circuit diagram of an illustrative light-emitting diode circuit that may be used in implementing a backlight element in an array of backlight elements for a backlight unit in accordance with an embodiment.

FIG. 7 is a circuit diagram of an illustrative backlight element such as one of backlight elements 94 of backlight unit 42 of FIG. 6. As shown in FIG. 7, backlight element 94 may be a four terminal device that receives control signals on terminals 86 and 88 and power on terminals 90 and 92. Backlight element 94 of FIG. 7 includes light-emitting diode 96 for emitting backlight 44 and light-emitting diode control circuitry that controls the light-emitting diode 96 (i.e., transistors T1, T2, and capacitor C).

The amount of current that flows through light-emitting diode 96 of FIG. 7 is controlled using transistors T1 and T2. Transistor T2, which is connected in series with diode 96, may serve as a voltage-controlled current source. Transistor T1 may control the application of a controlling voltage signal from source line SL to the gate of transistor T2. Capacitor C serves as a data storage element that temporarily stores the backlight data that has been loaded into backlight element 94. During operation of display 14, control signals such as source line signal SL and gate line signal GL may be used to control transistors T1 and T2 and thereby control the amount of current flowing through light-emitting diode 96. Light-emitting diode 96 and the other circuitry of element 94 may be integrated into a single semiconductor die or light-emitting diode 96 may be implemented as a discrete component while the remaining portion of circuitry 94 is implemented as a separate component (e.g., a separate integrated circuit semiconductor die mounted in a common semiconductor package).

With one illustrative embodiment, an analog control scheme is used to control the backlight elements. With analog control, gate line signal GL is asserted to turn on transistor T1. Turning on transistor T1 applies the source line signal SL to the gate of drive transistor T2. Capacitor C temporarily stores source line signal SL. Source line signal SL serves as an analog control voltage. The magnitude of source line signal SL that is applied to the gate of transistor T2 controls the magnitude of the drive current through light-emitting diode 96 gate voltage on transistor T2. The magnitude of the current flowing through light-emitting diode 96 controls that amount of backlight 44 that is emitted by light-emitting diode 96.

With another illustrative embodiment, a digital pulse width modulation control scheme is used to control the backlight elements. With this approach, each frame of image data (e.g., each $\frac{1}{60}^{th}$ of a second in a 60 Hz video stream) is divided into a set of subframes. There may be, for example, six subframes in each frame of image data being displayed on display 14. Each subframe may have a different length. For example, the six subframes may have respective lengths proportional to $2^0$, $2^1$, $2^2$, $2^3$, $2^4$, and $2^5$. A gate line signal GL may be asserted at the beginning of each subframe. Source line signals SL in each column serve as digital control signals. The status of source line signal SL (high or low) when the gate line signal GL is asserted at the beginning of each subframe determines whether a given light-emitting diode 96 is turned on or off for the duration of that subframe. By controlling the states of source line signals SL during each frame, light-emitting diode 96 can be turned on for certain subframes and can be turned off for certain subframes, thereby controlling the overall duration for which light-emitting diode 96 is turned on in that frame.

Figure 8:
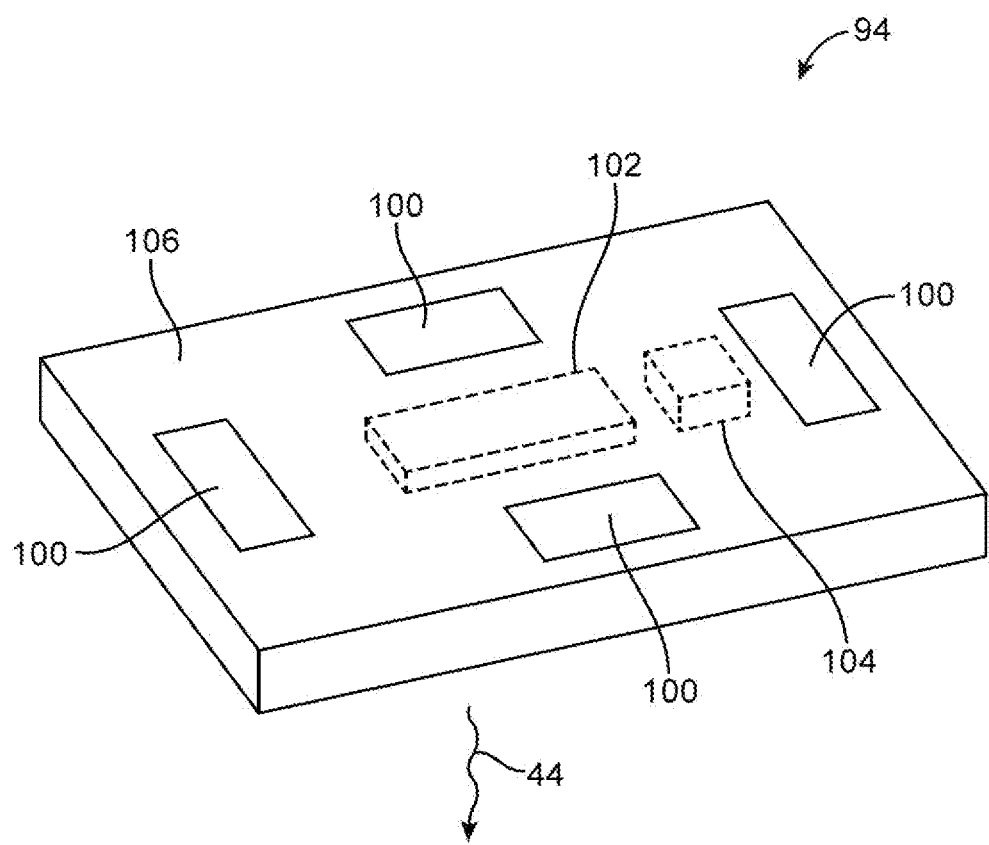
FIG. 8 is a perspective view of an illustrative packaged integrated circuit die containing a light-emitting diode and drive circuitry of the type shown in FIG. 7 in accordance with an embodiment.

If desired, the circuitry of each backlight element 94 may be packaged in a respective semiconductor package (e.g., a surface mount technology package or other suitable plastic package). FIG. 8 is a perspective view of an illustrative packaging configuration that may be used for backlight element 94. In the example of FIG. 8, backlight element 94 has plastic semiconductor package 106. Package 106 may be formed from molded plastic and may have terminals such as metal terminals (contacts) 100. Each of terminals 100 may be used for a respective one of the terminals of backlight element 94 of FIG. 7. A first of terminals 100 may be used for source line 88, a second of terminals 100 may be coupled to gate line 86, a third of terminals 100 may be coupled to power supply line 90, and a fourth of terminals 100 may be coupled to ground 92. In backlight element configurations that require more control lines, one or more additional terminals 100 may be provided.

Light-emitting diode 96 and the remaining components of backlight element 94 (e.g., transistor T1, transistor T2, and capacitor C) may be implemented on a single unitary integrated circuit die (see, e.g., semiconductor die 102) that is packaged within package 106. If desired, light-emitting diode 96 may be implemented as a discrete semiconductor device (see, e.g., device 104) while the remaining components of backlight element 94 (e.g., light-emitting-diode control circuitry such as transistor T1, transistor T2, and capacitor C) may be implemented as a separate integrated circuit die (see, e.g., semiconductor die 102). Package 106 is preferably used to house all of the circuitry of backlight element 94, but arrangements in which a portion of the circuitry of backlight element 94 such as the light-emitting-diode control circuit of that element is implemented in a first package and another portion of the circuitry of backlight element 94 is implemented in a second package that is mounted adjacent to the first package on substrate 80 may be used, if desired.

Figure 9:
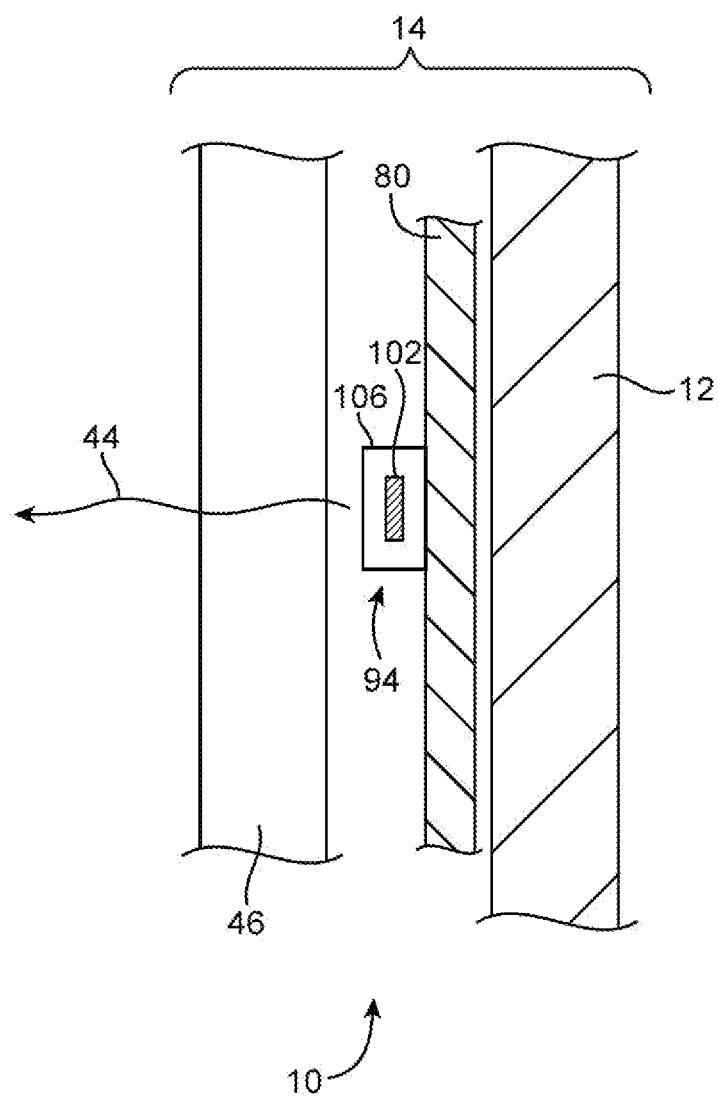
FIG. 9 is a cross-sectional side view of an illustrative display having a backlight formed from backlight elements mounted on a printed circuit substrate supported by an interior surface of an electronic device housing in accordance with an embodiment.

Packaged backlight elements such as backlight element 94 of FIG. 8 may be mounted in an array of rows and columns on printed circuit substrate 80 (FIG. 6). To enhance heat removal, it may be desirable to mount printed circuit substrate 80 on a heat sink. With one illustrative configuration, backlight elements 94 are mounted on printed circuit substrate 80 and printed circuit substrate 80 is mounted against an interior surface of housing 12, as shown in FIG. 9. In this type of arrangement, housing 12 may be formed from a material that helps dissipate heat such as aluminum or other metal. A layer of adhesive may be used to attach substrate 80 to housing 12 or other attachment mechanisms may be used (e.g., screws or other fasteners, etc.). Other heat sinking arrangements may be used to dissipate heat from backlight elements 94 if desired. The arrangement of FIG. 9 in which backlight elements are mounted against housing 12 is merely illustrative.

Figure 10:
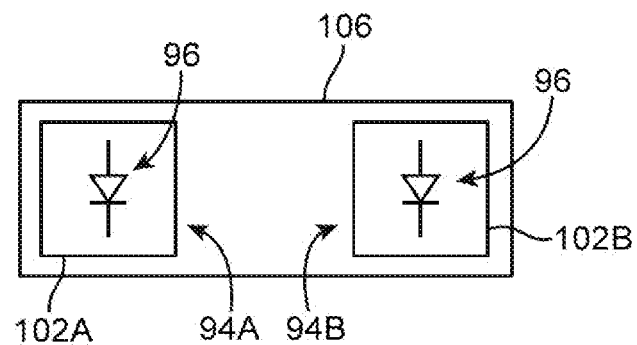
FIG. 10 is a diagram of an illustrative semiconductor package that contains two circuits of the type shown in FIG. 7 in accordance with an embodiment.

As shown in FIG. 10, two separate backlight elements may be packaged in a common package. In the FIG. 10 example, first backlight element 94A and second backlight element 94B are mounted in a common semiconductor package such as package 106 (e.g., a surface mount technology package formed form molded plastic or other suitable electronic component package). First backlight element 94A may include a light-emitting diode 96 that is implemented on the same integrated circuit die (i.e., semiconductor die 102A) as the light-emitting-diode control circuit formed from transistors T1 and T2 and capacitor C for backlight element 94A or may be implemented using two separate die. Similarly, second backlight element 94B may include a light-emitting diode 96 that is implemented on the same integrated circuit die (i.e., semiconductor die 102B) as the light-emitting-diode control circuit formed from transistors T1 and T2 and capacitor C for backlight element 94B or may be implemented using two separate die.

Figure 11:
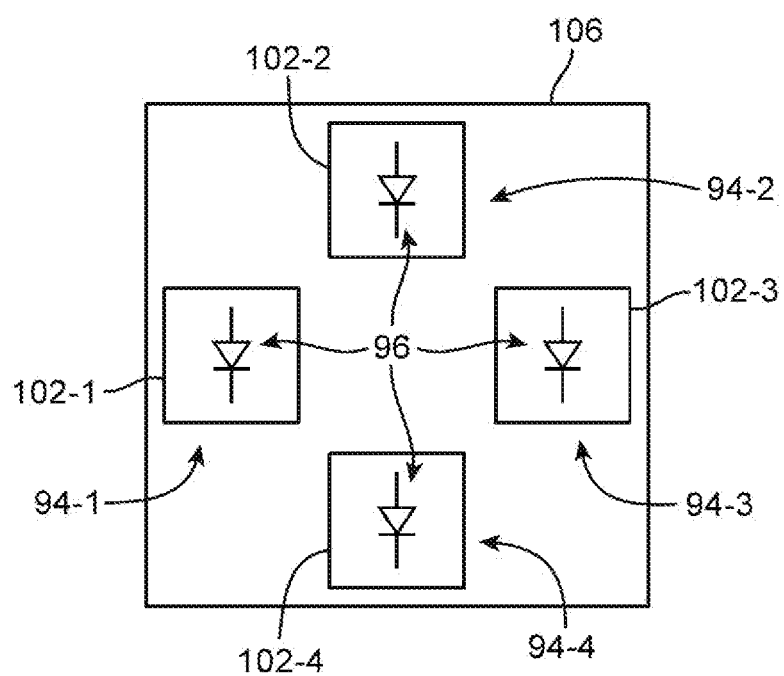
FIG. 11 is a diagram of an illustrative semiconductor package that contains four circuits of the type shown in FIG. 7 in accordance with an embodiment.

If desired, four backlight elements may be packaged in a common package. As shown in FIG. 11, for example, backlight element 94-1, backlight element 94-2, backlight element 94-3, and backlight element 94-4 may be packaged in a common semiconductor package such as package 106. First backlight element 94-1 may include a light-emitting diode 96 that is implemented on the same integrated circuit die (i.e., semiconductor die 102-1) as the light-emitting-diode control circuit formed from transistors T1 and T2 and capacitor C for backlight element 94-1 or may be implemented using two separate die. Second backlight element 94-2 may include a light-emitting diode 96 that is implemented on the same integrated circuit die (i.e., semiconductor die 102-2) as the light-emitting-diode control circuit formed from transistors T1 and T2 and capacitor C for backlight element 94-2 or may be implemented using two separate die. Third backlight element 94-3 may include a light-emitting diode 96 that is implemented on the same integrated circuit die (i.e., semiconductor die 102-3) as the light-emitting-diode control circuit formed from transistors T1 and T2 and capacitor C for backlight element 94-3 or may be implemented using two separate die. Fourth backlight element 94-4 may include a light-emitting diode 96 that is implemented on the same integrated circuit die (i.e., semiconductor die 102-4) as the light-emitting-diode control circuit formed from transistors T1 and T2 and capacitor C for backlight element 94-4 or may be implemented using two separate die.

To accommodate additional control signals, packages 106 of FIGS. 10 and 11 may be provided with additional terminals 100 (e.g., additional source line and/or gate line terminals). If, for example, package 106 of FIG. 10 is shared between two columns in backlight unit 42, an additional terminal 100 may be included in package 106 to accommodate an additional source line. The first source line in this scenario is used to control backlight element 94A in a first column of backlight elements in the backlight element array and the second source line is used to control backlight element 94B in an adjacent second column of backlight elements in the backlight element array. The gate line GL can be shared between elements 94A and 94B. If desired, source lines can be shared and other arrangements can be used for interconnecting the control lines of the backlight array to the terminals of backlight elements 94.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
   an array of display pixels; and
   a backlight that provides backlight illumination for the array of display pixels, wherein the backlight comprises an array of backlight elements, wherein each backlight element includes a light-emitting diode and a light-emitting-diode control circuit that controls how much backlight is emitted by the light-emitting diode, wherein each light-emitting diode in the backlight is independently controlled by a respective one of the light-emitting-diode control circuits, wherein each backlight element has a plastic semiconductor package, wherein the light-emitting-diode control circuit of each backlight element comprises first and second transistors and a capacitor coupled between the first and second transistors, and wherein the first and second transistors, the capacitor, and the light-emitting diode of each backlight element are part of a common semiconductor die that is packaged in the plastic semiconductor package.

2. The display defined in claim 1 wherein the light-emitting diode of each backlight element is connected in series with the second transistor of that backlight element.

3. The display defined in claim 1 wherein the plastic semiconductor package for each backlight element also contains the light-emitting diode of another one of the backlight elements.

4. The display defined in claim 1 wherein the plastic semiconductor package for each of the backlight elements contains four of the backlight elements.

5. The display defined in claim 1 further comprising a substrate on which the array of backlight elements is mounted.

6. The display defined in claim 5 further comprising metal structures, wherein the substrate is mounted on the metal structures to dissipate heat from the backlight elements through the metal structures.

7. The display defined in claim 6 wherein the metal structures comprise electronic device housing structures.

8. The display defined in claim 6 wherein the array of display pixels comprises an array of liquid crystal display pixels.

9. An electronic device, comprising:
an electronic device housing;
display layers that display images; and
a backlight with an array of locally dimmed backlight elements that provide backlight illumination for the display layers, each backlight element including a light-emitting diode and a light-emitting-diode control circuit, wherein each light-emitting diode in the backlight is independently controlled by a respective one of the light-emitting-diode control circuits, wherein the light-emitting-diode control circuit comprises first and second transistors and a capacitor coupled between the first and second transistors, wherein the light-emitting diode, the first transistor, the second transistor, and the capacitor of each backlight element are formed as part of a common semiconductor die.

10. The electronic device defined in claim 9 wherein the backlight is mounted on an interior surface of the electronic device housing and wherein the electronic device housing comprises metal.

11. A display, comprising:
liquid crystal display layers that display images; and
a backlight unit with an array of locally dimmed backlight elements that provide backlight for the liquid crystal display layers, each backlight element including a light-emitting diode and a light-emitting-diode control circuit, wherein the light-emitting-diode control circuit comprises first and second transistors and a capacitor coupled between the first and second transistors, wherein the light-emitting diode, the first transistor, the second transistor, and the capacitor are formed as part of a common semiconductor die in a plastic semiconductor package, and wherein each light-emitting diode in the backlight is independently controlled by a respective one of the light-emitting-diode control circuits.

12. The display defined in claim 11 wherein the light-emitting-diode control circuit of each backlight element receives control signals from a gate line and a source line.

* * * * *